UNITED STATES PATENT OFFICE.

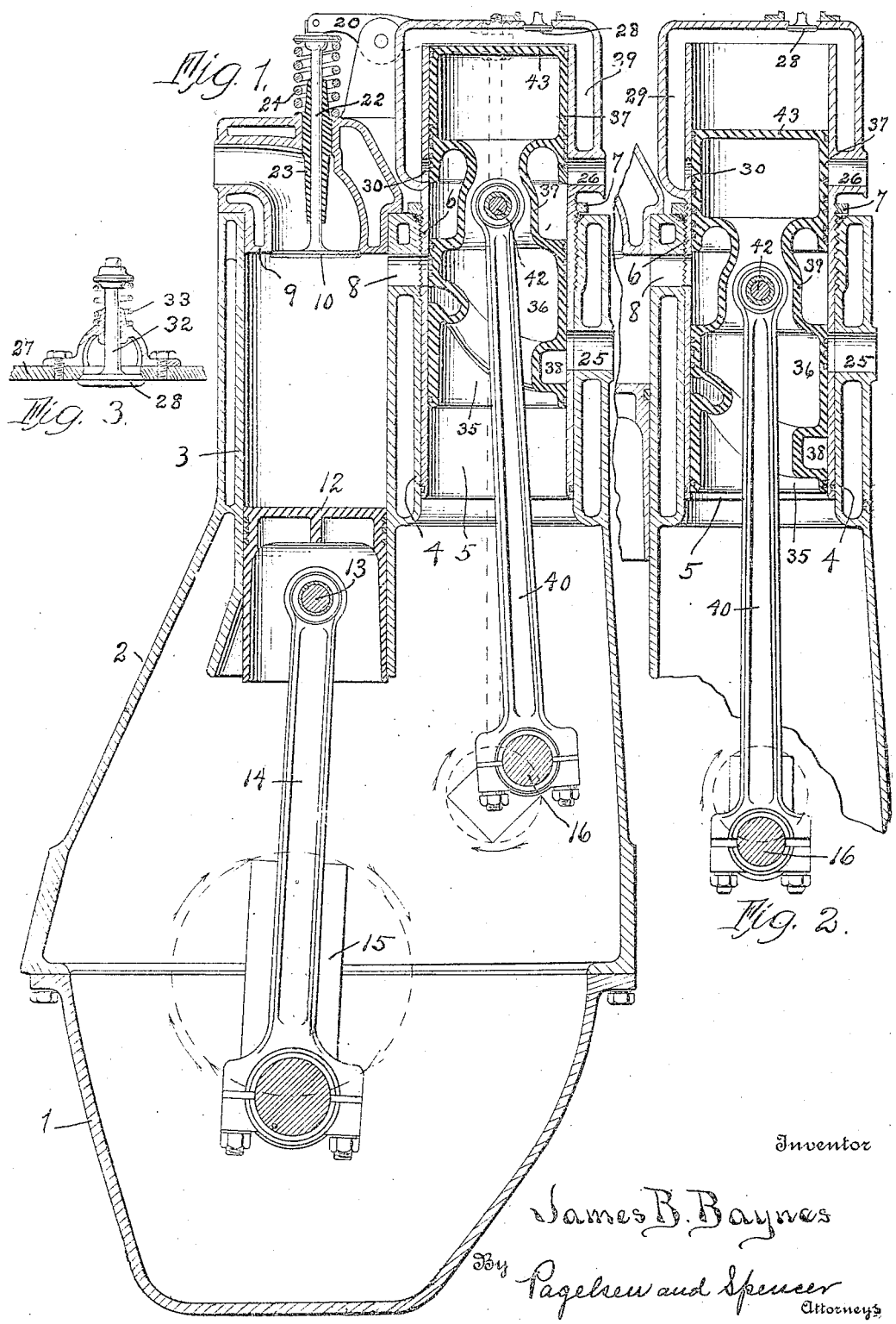

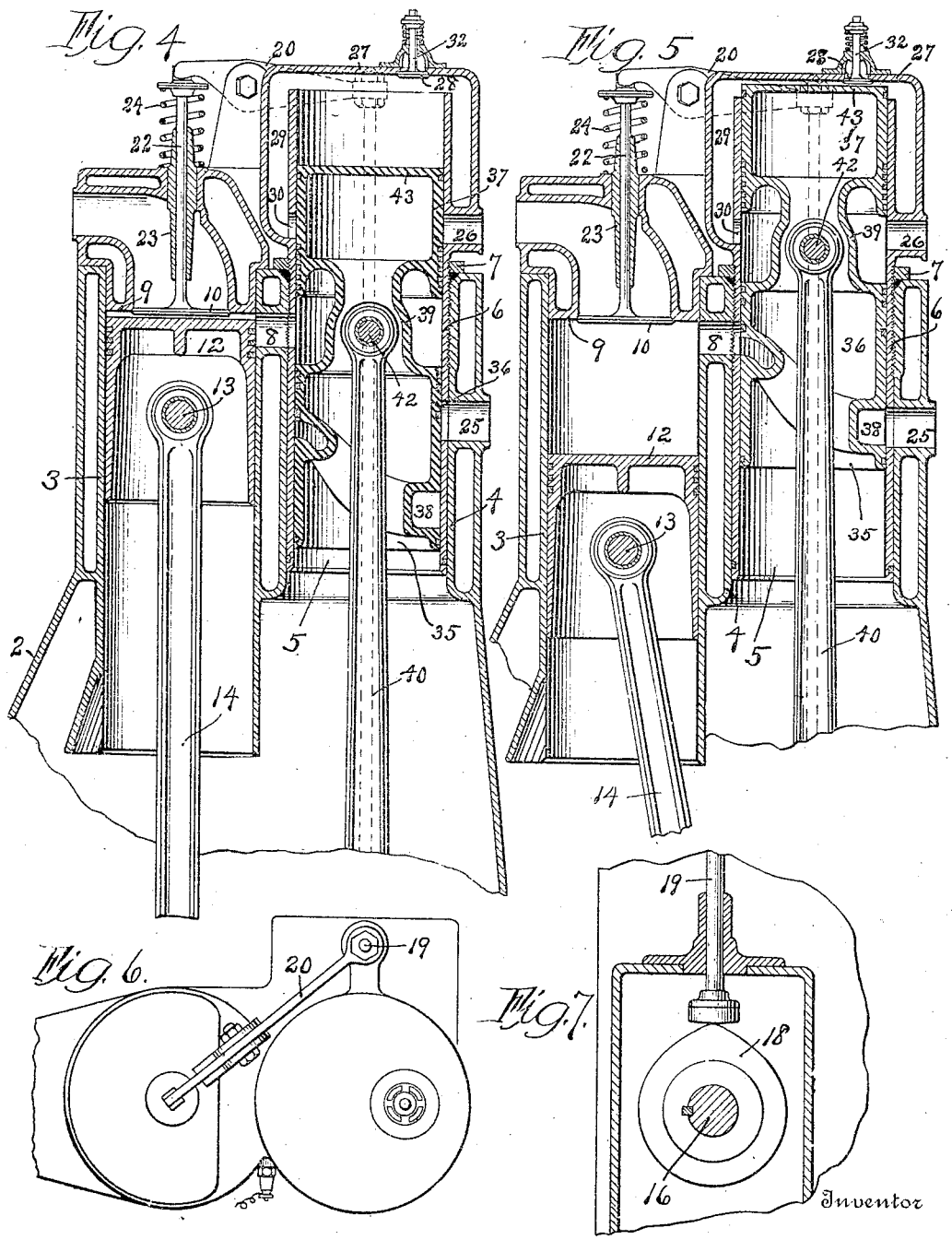

JAMES B. BAYNES, OF CINCINNATI, OHIO.

INTERNAL-COMBUSTION ENGINE.

1,257,447.  Specification of Letters Patent.  Patented Feb. 26, 1918.

Application filed July 9, 1917. Serial No. 179,370.

*To all whom it may concern:*

Be it known that I, JAMES B. BAYNES, a citizen of the United States, residing at Cincinnati, in the county of Hamilton and State of Ohio, have invented a new and Improved Internal-Combustion Engine, of which the following is a specification.

This invention relates to four-cycle internal-combustion motors, and its object is to provide for a valve mechanism which shall conduce to the obtaining of maximum efficiency as well as maximum power of the engine.

This invention consists, in combination with an internal-combustion engine cylinder having a head provided with an inwardly movable puppet valve of comparatively large diameter and means to move the valve from its seat, of a piston movable in the cylinder and so connected that the clearance at the end of the scavenging stroke is very small, a cylindrical valve chamber positioned adjacent to the cylinder and fitted with a valve of the "dumb-bell" type and consisting of three parts, the space between two of the parts comprising the explosion chamber of the engine and a second space of like nature constituting an intake passage for the fuel.

It also consists in forming a compression chamber at one end of the valve chamber and providing an intake valve for said chamber and proper passages so that the air compressed therein is guided to force the burnt gases out of the explosion chamber in the valve, and replace it with fresh air.

It further consists in a valve comprising a hollow body consisting of several connected cylinders, the valve having a pin about midway its ends to which the valve-actuating rod is connected, the position of the pin being such that the wear incident to the angular thrusts of this rod is negligible.

In the accompanying drawings, Figure 1 is a vertical central section of the engine and valve chamber with the piston at the bottom of the charging stroke. Fig. 2 is a similar section of the valve chamber with the valve at the bottom of its stroke. Fig. 3 is a section of a valve seat at the top of the valve chamber. Fig. 4 is a section of the cylinder and valve chamber with the piston at the end of the compression stroke which is at the beginning of the working stroke. Fig. 5 is a similar section with the valve at the top of its stroke and the piston half way down its charging stroke. Fig. 6 is a plan of the exhaust valve operating lever. Fig. 7 is an elevation of the exhaust valve cam.

Similar reference characters refer to like parts throughout the several views.

The crank case of this engine comprises the lower part 1 and the upper part 2 which connects to the cylinder 3 and to the shell 4 into which a sleeve 5, which constitutes a replaceable wearing surface of the valve chamber, may be mounted. This sleeve is shown formed with a threaded portion 6 on which there is a lock nut 7. This permits the sleeve and its ports to be accurately adjusted relative to the intake port of the cylinder and to the valve itself.

The cylinder is formed with an intake port 8 and its head 9 is formed with a large opening for the exhaust, which opening is normally closed by means of the valve 10 of the puppet type. The area of the exhaust port is preferably between one third and one half the area of the piston and insures complete scavenging of the cylinder. The piston 12, wrist-pin 13, connecting rod 14, crank shaft 15, cam shaft 16 and means to drive the cam shaft half the speed of the crank shaft may be of any well known construction. The connecting rod is of such a length that when the piston is at the upper end of its stroke, there is a minimum of space at that end of the cylinder.

On the cam shaft is a cam 18 that engages the rod 19 which connects to one end of the lever 20, whose opposite end engages the valve stem 22 which is slidable in the guide 23. The valve 10 is depressed during each scavenging stroke of the piston and is held on its seat the remainder of the cycle by the spring 24. Any desired passages for cooling water may be provided. The valve chamber is formed with an inlet port 25 to which the carbureter is connected either directly or by means of a manifold, with an exhaust port 26, with a head 27 in which a spring-held intake valve 28 is mounted, and with a combined air-compression chamber and passage 29 that connects to the port 30. The valve 28 may be mounted on a stem 32 and be held up against its seat by the spring 33 as shown in Fig. 3.

The valve is of the "dumb-bell" or multi-piston type and is formed of the parts 35, 36 and 37. In practice the parts 35 and 36 may be formed as a single cylinder provided with a circumferential groove or passage 38 for the fuel. The upper part 37 connects to the remainder of the valve by means of a hollow neck 39 into which the upper end of the connecting rod 40 is shown to extend, a pin 42 carried by the valve extending through the upper end of the connecting rod whose lower end engages the cam shaft 16 in any desired manner to be moved thereby between the limits indicated by Figs. 2 and 5. The upper end of the valve is closed by a head 43. It is to be understood that the various parts of this engine, such as the cylinder, valve casing and valve, may be made separate or integral as engineering practice may dictate. The reason for positioning the pin 42 midway the ends of the valve is to reduce the wear of the valve to a minimum through lengthening the rod 40 and through an even application of lateral pressure on the valve.

By providing this engine with one very large valve 10 in the cylinder head and by employing a slide valve to control the fuel intake, and by providing means for scavenging the explosion chamber in the valve, substantially all the burnt gases are removed from the engine at each cycle. The operation of the engine is as follows.

Fig. 1 shows the parts as they are at the beginning of the compression stroke, the piston moving up and the valve down so that the charge within the cylinder may be compressed within the space between the two parts 36 and 37 of the valve. At the end of the compression stroke the parts will be as shown in Fig. 4, the compression space being in full register with the port 8 of the cylinder.

As the piston goes down under the force of the explosion, the valve will move to the position shown in Fig. 2 and back to the position shown in Fig. 4, the compression space being in connection with the port 8 all of the time that the piston is moving under the force of the explosion. As the piston moves up, the valve 10 will be moved down a short distance to permit the burnt gases to escape, the valve moving up until at the end of the scavenging stroke it reaches the position shown in Fig. 1, that is, not until the piston has reached the end of its scavenging stroke does the compression chamber get out of connection with the port 8.

With the beginning of the charging stroke the passage 38 connects with the intake port 8, the valve moving to the position shown in Fig. 5 and then back to the position shown in Fig. 1 while the piston is moving down to draw in a charge of fuel.

The upper end of the valve as it moves from the position shown in Fig. 1 to that shown in Fig. 2 draws in a charge of air, the valve 28 moving from its seat to permit this. As the valve moves up, the air above the valve is compressed into the space 29 until the valve reaches the position shown in Fig. 1 when the ports 30 and 26 are opened and the air compressed in the space 29 rushes through the compression chamber and carries off or forces out the burnt gases. This space is therefore thoroughly scavenged after each explosion.

The air which replaces the burnt gases in the explosion chamber in the valve will mix during the compression period with the charge that is drawn into the cylinder during the charging stroke, and the richness of this charge must be determined with this air in the explosion chamber in view. The amount of air taken into the chamber 29 can always be more than enough to fill the explosion chamber. It is evident that an explosive mixture could be drawn from a proper carbureter into the chamber 29 instead of air and left in the explosion chamber to mix with the charge taken into the cylinder through the passage 38.

The usual type of motor is provided with puppet valves in the head or in lateral extensions of the head. The areas of these valves are necessarily limited because they must take care of the intake of the charge as well as the exhaust of the burnt gases. In the present case, the area of the exhaust is limited only by the size of the head and therefore can be as large as desired and the back pressure of the exhaust entirely eliminated while the burnt gases will be completely expelled.

The proportions and details of this engine may all be changed without departing from the spirit of my invention as set forth in the claims.

I claim:—

1. In an internal-combustion engine, the combination of a cylinder, an exhaust valve in the head thereof, a valve chamber adjacent thereto and connecting thereto by a port, a piston valve slidable in the valve chamber and formed with an explosion chamber intermediate its ends to receive the compressed charge of fuel and hold it during its combustion, said valve chamber having a compression chamber at its upper end and a by-pass and an exhaust port so positioned that the air compressed in the upper end of the valve chamber will scavenge the explosion chamber when the valve is at the upper end of its stroke, and a valve to control the inflow of air to said compression chamber.

2. In an internal-combustion engine, the combination of a cylinder and an exhaust valve in the head thereof, a valve chamber adjacent thereto and connected intermediate its ends to the upper end of said cylinder by a port and also provided with intake passages for air and fuel, a piston valve slidable in said chamber and provided with a transverse passage and with an explosion chamber intermediate its ends, and means to move said valve.

3. In an internal-combustion engine, the combination of a cylinder and an exhaust valve in the head thereof, a valve chamber adjacent thereto and connected intermediate its ends to the upper end of said cylinder by a port and also provided with an intake port for the fuel intermediate its ends, a valve slidable in said chamber and formed with a chamber intermediate its ends to receive the explosive charge of the engine and with a transverse passage adapted to connect the fuel intake port of the valve chamber to the intake port of the engine.

4. In an internal-combustion engine, the combination of a cylinder and an exhaust valve in the head thereof, a valve chamber adjacent thereto and connecting thereto by a port, a piston valve slidable in the valve chamber and formed with a chamber to receive the explosive charge of the engine, said valve chamber being formed with a compression chamber at one end and with a by-pass and with an exhaust port, one end of the valve serving to compress the air and then open the by-pass and exhaust port into said chamber after the charge is exploded to scavenge the chamber.

5. In an internal-combustion engine, the combination of a cylinder and an exhaust valve therefor, a valve casing adjacent the cylinder and communicating therewith by means of an intake port for the cylinder, and provided with intake and exhaust ports, a valve slidable within the valve casing and formed with a chamber to receive the explosive charge of the engine and with an intake passage for the same, and means for moving the said chamber and passage alternately into communication with the intake port of the engine.

6. In an internal-combustion engine, the combination of a cylinder and an exhaust valve therefor, a valve casing adjacent the cylinder and communicating therewith by means of an intake port for the cylinder, said casing being provided with intake and exhaust ports, a valve slidable within the valve casing and formed with a chamber to receive the explosive charge of the engine and with a passage through which the fuel may flow from the intake port of the valve casing and the intake port of the engine, said valve casing being formed with a chamber wherein air may be compressed preparatory to using it to force burnt gases from the chamber in the valve out through the exhaust port of the valve chamber.

7. In an internal-combustion engine, the combination of a cylinder, an exhaust valve in the head of the cylinder of more than half the diameter of the cylinder, a valve casing adjacent the cylinder and communicating therewith by means of an intake port for the cylinder, said valve chamber being provided with intake and exhaust ports, a valve slidable in the valve chamber and provided with an explosion chamber and with a transverse passage, and means for moving the valve from the lower limit of its movement when the explosion chamber communicates with the intake port of the cylinder to its upper position when said explosion chamber communicates with the exhaust port of the valve chamber and the transverse passage communicates with the two intake ports.

JAMES B. BAYNES.